United States Patent
Wu et al.

(10) Patent No.: US 7,347,706 B1
(45) Date of Patent: Mar. 25, 2008

(54) LIGHT EMITTING DIODE (LED) BASED STREET LIGHT AND OTHER LIGHTING APPLICATIONS

(75) Inventors: Chen-Ho Wu, Los Altos Hills, CA (US); Chin-Wang Tu, Cupertino, CA (US); Shih Chang Wang, Chung Ho (TW)

(73) Assignee: Leotek Electronics Corporation, Lung-Tan, Tao-Yuan County (TW)

( * ) Notice: Subject to any disclaimer, the term of this patent is extended or adjusted under 35 U.S.C. 154(b) by 36 days.

(21) Appl. No.: 11/486,230

(22) Filed: Jul. 12, 2006

Related U.S. Application Data

(60) Provisional application No. 60/701,825, filed on Jul. 21, 2005.

(51) Int. Cl.
*H01R 13/62* (2006.01)
(52) U.S. Cl. .................................. 439/320; 430/642
(58) Field of Classification Search ............. 439/320, 439/641, 642
See application file for complete search history.

(56) References Cited

U.S. PATENT DOCUMENTS

| | | | |
|---|---|---|---|
| 5,435,740 A * | 7/1995 | Crededio et al. | 439/320 |
| 5,949,347 A | 9/1999 | Wu | |
| 6,911,915 B2 | 6/2005 | Wu | |

* cited by examiner

*Primary Examiner*—Renee Luebke
*Assistant Examiner*—Vanessa Girardi
(74) *Attorney, Agent, or Firm*—DLA Piper US LLP

(57) ABSTRACT

An LED lamp module for use with a threaded electrical socket connector is provided, which includes an LED light engine with a first electrical connector, a second electrical connector having a first end electrically engagable with the first electrical connector and a second end having a threaded outer surface compatible with a threaded electrical socket connector. The LED lamp module further comprises a sleeve surrounding the first electrical connector and the first end such that the sleeve allows for relative rotation between the first electrical connector and the first end in a loosened state, and restricts relative rotation between the first electrical connector and the first end in a tightened state. A method for installing a retrofit LED lamp module in a housing which physically restricts full rotation of an LED light engine is also provided. The method includes connecting a first electrical connector to a second electrical connector, wherein the first electrical connector is attached to an LED light engine, and wherein the second electrical connector further comprises a first end electrically engagable with the first electrical connector, and a second end having a threaded outer surface compatible with a threaded electrical socket connector. The method further comprises tightening this connection via a sleeve surrounding the first electrical connector and the first end such that the sleeve allows for relative rotation between the first electrical connector and the first end in a loosened state, and restricts relative rotation between the first electrical connector and the first end in a tightened state.

26 Claims, 4 Drawing Sheets

LIGHT EMITTING DIODE (LED) BASED STREET LIGHT AND OTHER LIGHTING APPLICATIONS

This application claims the benefit of U.S. Provisional Application No. 60/701,825, filed Jul. 21, 2005, and entitled Light Emitting Diode (LED) Based Street Light and Other Lighting Applications.

FIELD OF THE INVENTION

The present invention relates to the design and the installation of retrofit Light Emitting Diode (LED) modules to replace existing light sources including street lights, parking lot lights, and various other lighting applications. More particularly, the present invention relates to a method for installing a retrofit LED lamp module in a housing which physically restricts full rotation of an LED light engine.

BACKGROUND OF THE INVENTION

Light Emitting Diodes (LEDs) have been used in many applications to replace conventional incandescent lamps, fluorescent lamps, neon tube and fiber optics light sources in order to reduce costs and to increase reliability. Due to the fact that LEDs consume less electrical energy than most conventional light sources, while exhibiting much longer lifetime, many designs could be made for various applications, such as traffic signal lights, channel letters, conventional illuminated commercial signs, street name signs, and street lights.

In the case of street lights, parking lot lights and area illumination lights, most existing products utilize HID lamps as their respective light source. Cobrahead luminaires and shoebox luminaires are two frequently used outdoor luminaires for such applications. A cross section schematic drawing of a conventional cobrahead luminaire is provided in FIG. 1a. As illustrated, such a cobrahead luminaire comprises a lamp 100, a lens 110, incoming AC lines 120, a cobra housing 130, a reflector 140, and a lamp socket 150. In FIG. 1b, a cross section schematic drawing of a conventional shoebox luminaire is also provided. As illustrated, such a shoebox luminaire comprises a lamp 200, a lens 210, incoming AC lines 220, a shoebox housing 230, a reflector 240, and a lamp socket 250.

Major disadvantages of using these lamps, however, are 1) they need to be replaced often due to the shorter lifespan of the lamp; 2) part of the light from the HID lamp is wasted because it is aimed in directions not useful to the original lighting purpose; 3) some of them contain hazardous material; and 4) they exhibit a non-favorable spectrum at night. It is therefore desirable to replace existing HID lamps with long-lasting LED products.

Current LED retrofitting mechanisms are also limited. For example, current retrofitting methods require LED light engines to be screwed onto their respective housings. However, physical constraints of the housing sometimes do not allow for LED light engines to fully rotate. It is therefore desirable to also develop a retrofitting method wherein the LED light engine does not need to be fully rotated.

SUMMARY OF THE INVENTION

The present invention solves the aforementioned problems by providing an LED lamp module that does not require the LED light engine to attach to a housing via full rotation.

The LED lamp module of the present invention is for use with a threaded electrical socket connector and includes an LED light engine with a first electrical connector and having a plurality of LEDs mounted to a printed circuit board, a second electrical connector having a first end electrically engagable with the first electrical connector and a second end having a threaded outer surface compatible with a threaded electrical socket connector. The LED lamp module further comprises a sleeve surrounding the first electrical connector and the first end such that the sleeve allows for relative rotation between the first electrical connector and the first end in a loosened state, and restricts relative rotation between the first electrical connector and the first end in a tightened state.

Another aspect of the present invention is a method for installing a retrofit LED lamp module in a housing which physically restricts full rotation of an LED light engine. This method includes connecting a first electrical connector to a second electrical connector, wherein the first electrical connector is attached to the LED light engine, and wherein the second electrical connector further comprises a first end electrically engagable with the first electrical connector, and a second end having a threaded outer surface compatible with a threaded electrical socket connector. This method further comprises tightening this connection via a sleeve surrounding the first electrical connector and the first end such that the sleeve allows for relative rotation between the first electrical connector and the first end in a loosened state, and restricts relative rotation between the first electrical connector and the first end in a tightened state.

Other objects and features of the present invention will become apparent by a review of the specification, claims and appended figures.

DETAILED DESCRIPTION OF THE PREFERRED EMBODIMENTS

The present invention is an LED lamp module utilizing high power LEDs that is ideal for installation in conventional traffic signal lamps. Moreover, the present invention provides an improved connection mechanism for installing a retrofit LED lamp engine in a housing which physically restricts full rotation of an LED light engine.

Figure 1A:
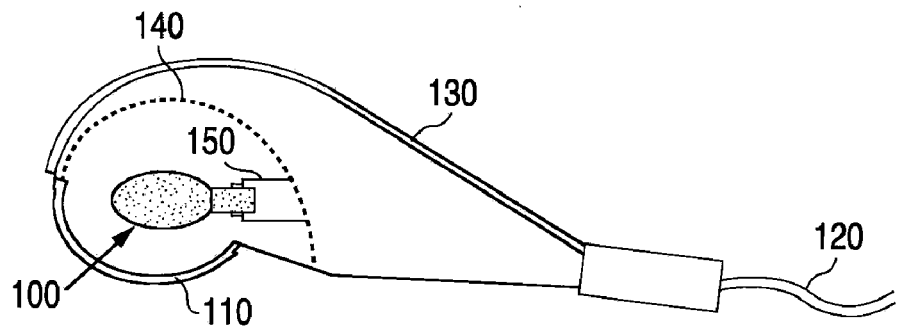
FIG. 1a is a schematic cross section view of a traditional cobrahead luminaire.
Figure 1B:
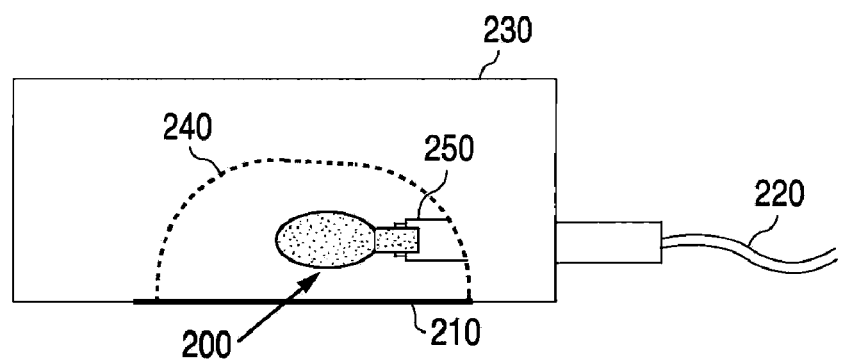
FIG. 1b is a schematic cross section view of a traditional shoebox luminaire.
Figure 2A:
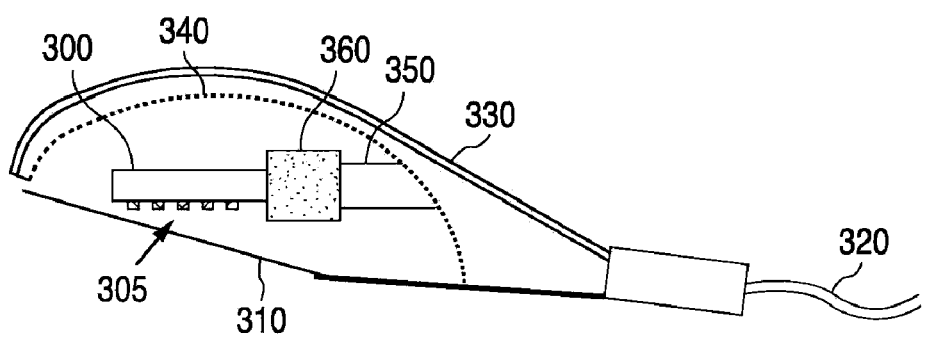
FIG. 2a. is a schematic cross section view of a LED retrofitted cobrahead luminaire with easy connection mechanism FIG. 2b. is a schematic cross section view of a LED retrofitted shoebox luminaire with easy connection mechanism.
Figure 2B:
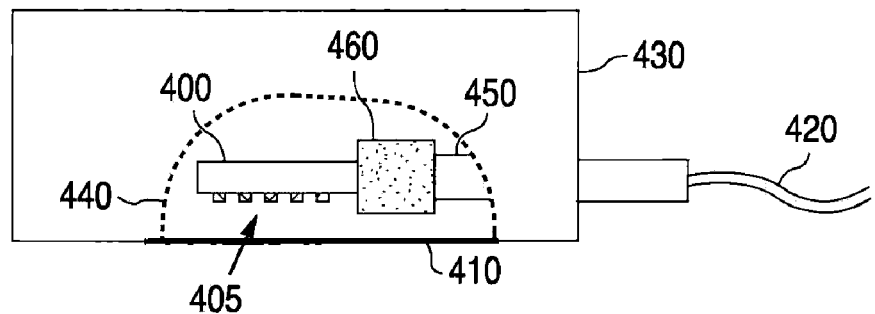

In FIG. 2a, a schematic of an LED retrofitted cobrahead luminaire in accordance with the present invention is provided. As illustrated, such a cobrahead luminaire comprises an LED light engine 300, an LED array 305, a lens 310, incoming AC lines 320, a cobra housing 330, a reflector 340, and a lamp socket 350. In FIG. 2b, a schematic of an LED retrofitted shoebox luminaire is also provided. Within this embodiment, the shoebox luminaire comprises an LED light engine 400, an LED array 405, a lens 410, incoming AC lines 420, a shoebox housing 430, a reflector 440, and a lamp socket 450. Details of connection mechanisms in accordance with the present invention for each of these two types of luminaires are summarized below.

Figure 3A:
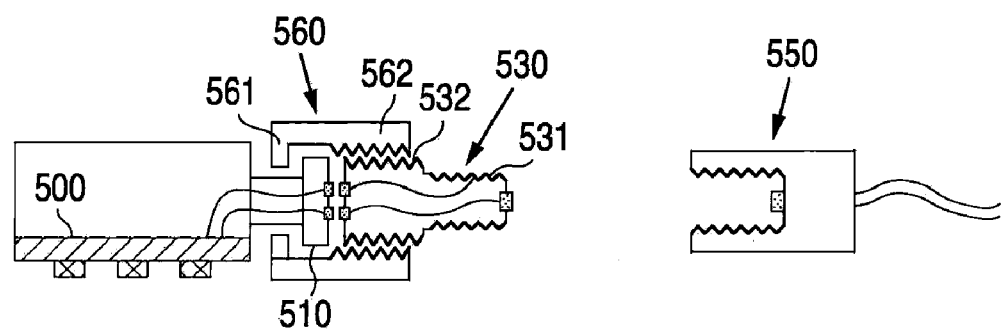
FIG. 3a is a schematic cross section view of a first connection adaptor for a retrofit LED light engine.

FIG. 3a shows a schematic cross section of one embodiment of a connection mechanism in accordance with the present invention. Within such embodiment, an LED light engine 500 further comprises a flanged end 510 with an electrical connector from the LED light engine 500. Flanged end 510 electrically connects to a first end of a retrofit threaded screw-in electrical connector 530. The second end of electrical connector 530 then connects to the original housing lamp socket 550 of the luminaire.

A sleeve 560 having a flanged end 561 and a threaded end 562 is used to secure the mechanical and electrical connection between LED light engine 500 and electrical connector 530. As illustrated in FIG. 3a, threads 531 and 532 are provided on opposite ends of electrical connector 530. The threads 532 on the first end of connector 530 mate with the threads 562 of sleeve 560. By tightening sleeve 560 against the threads on connector 530, the flange end 561 of sleeve 560 grabs the flanged end 510 of LED light engine 500.

It should be noted that if tightening sleeve 560 is in a tightened state, the frictional force between LED light engine 500, connector 530, and sleeve 560 will restrict rotation (unless the rotational force exceeds the breaking point force of either LED light engine 500, connector 530, or sleeve 560). For LED light engines that cannot be fully rotated in a housing, such a tightening mechanism is an improvement over the prior art. And although the present invention does allow for LED light engine 500 to rotate relative to connector 530 while in a loosened state, the extent to which this relative rotation is needed is minimal. Moreover, while the present invention allows for LED light engine 500 to be finely rotated for alignment purposes while in a loosened state, the prior art requires full rotation in order for LED light engine 500 to be securely connected to the desired housing.

Figure 3B:
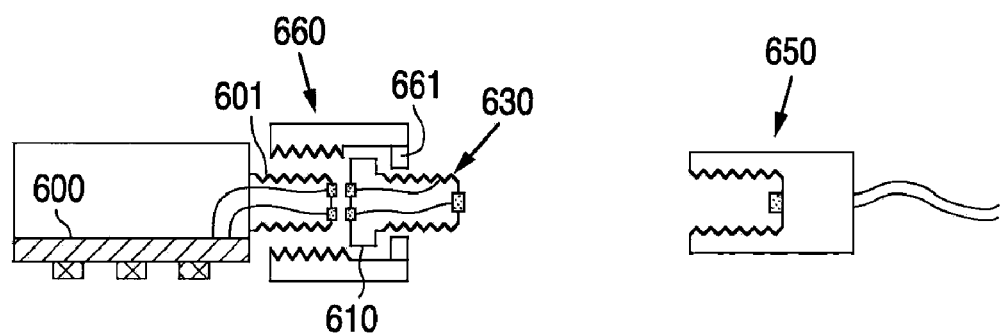
FIG. 3b is a schematic cross section view of a second connection adaptor for a retrofit LED light engine.

In an alternative embodiment, threads 601 may also be placed on the near side of LED light engine 600 as shown in FIG. 3b. Such an arrangement is a reverse of the mechanism described in FIG. 3a, wherein flange 610 is now located at the first end of connector 630. Accordingly, by tightening sleeve 660 against the threads 601 of LED light engine 600, the flanged end 661 of sleeve 660 grabs flange 610 at the first end of connector 630. The second end of electrical connector 630 then connects to the original housing lamp socket 650 of the luminaire.

Figure 3C:
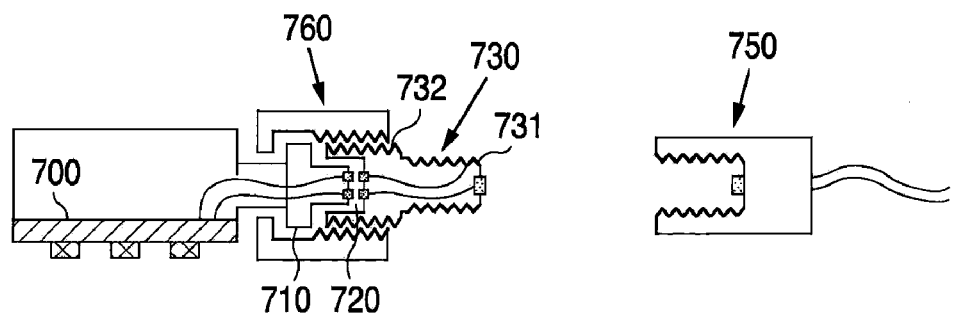
FIG. 3c is a schematic cross section view of a third connection adaptor for a retrofit LED light engine.

In another embodiment illustrated in FIG. 3c, electrical connector 730 comprises an indented hollow cavity 720 at its first end. Such an embodiment is similar to the embodiment described in FIG. 3a except for the existence of indented hollow cavity 720. Thus, flange 710 is again located on the near end of LED light engine 700, and threads 732 are again located on the first end of connector 730. Here, however, flange 710 further comprises a male end which mates with cavity 720 when sleeve 760 is tightened. The second end 731 of electrical connector 730 then again connects to the original housing lamp socket 750 of the luminaire.

Figure 3D:
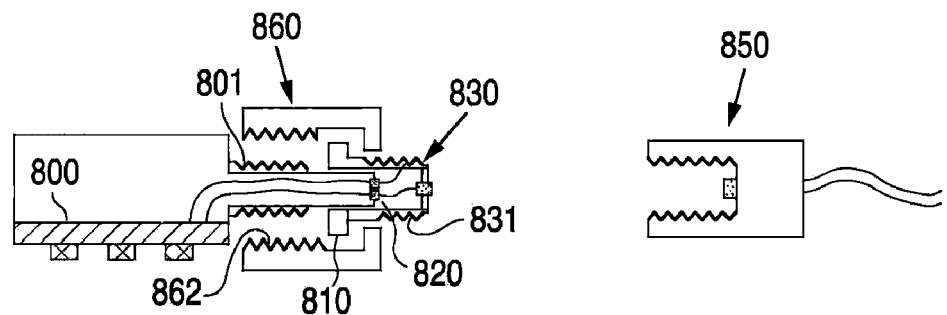
FIG. 3d is a schematic cross section view of a fourth connection adaptor for a retrofit LED light engine.

In yet another embodiment illustrated in FIG. 3d, the first end of connector 830 comprises both indented hollow cavity 820 and flange 810. Such an embodiment is similar to the embodiment described in FIG. 3c except for the existence of threads 801 on the end of the LED light engine. Moreover, as sleeve 860 is tightened here, threads 801 on the near end of LED light engine 800 mate with threads 862 on sleeve 860, and a male end of LED light engine 800 mates with cavity 820. The second end 831 of electrical connector 830 then connects to the original housing lamp socket 850 of the luminaire.

Figure 4A:
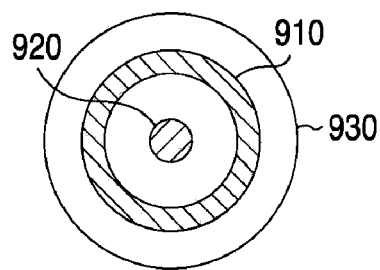
FIG. 4a is a schematic rear view of a screw-in retrofit threaded electrical connector with an axial contact and a ring contact.
Figure 4B:
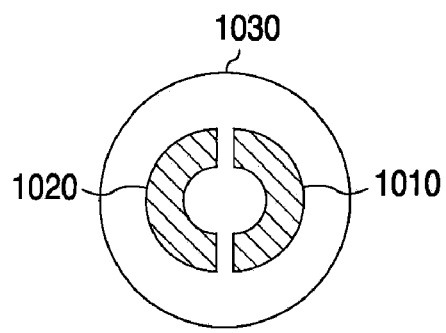
FIG. 4b is a schematic rear view of a screw-in retrofit threaded electrical connector with two half ring contacts.
Figure 4C:
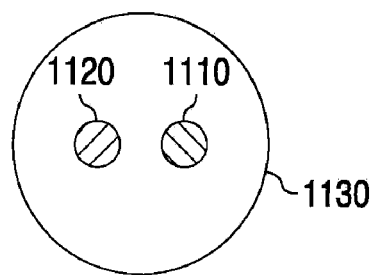
FIG. 4c is a schematic rear view of a screw-in retrofit threaded electrical connector with two circular contacts.
Figure 4D:
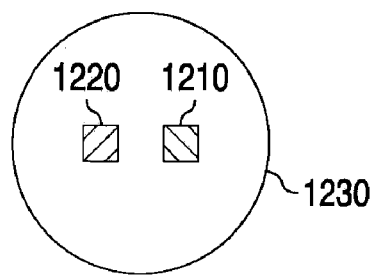
FIG. 4d is a schematic rear view of a screw-in retrofit threaded electrical connector with two square contact.

In each of the above embodiments, it should be appreciated that various ways could be used to arrange the electrical contacts between the retrofit LED light engine unit and the screw-in electrical connector. FIG. 4a, for example, shows the rear end of a screw-in electrical connector 930 comprising a ring contact 910 of first polarity and an axial contact 920 of second polarity. In another embodiment as illustrated in FIG. 4b, connector 1030 comprises a pair of half ring contacts, 1010 and 1020, which respectively provide a first and second polarity. In yet another embodiment shown in FIG. 4c, connector 1130 comprises two round contact regions, 1110 and 1120, having a first and second polarity, respectively, as. And instead of using round contact regions, connector 1230 may also use square contacts, 1210 and 1220, as shown in FIG. 4d.

Figure 5A:
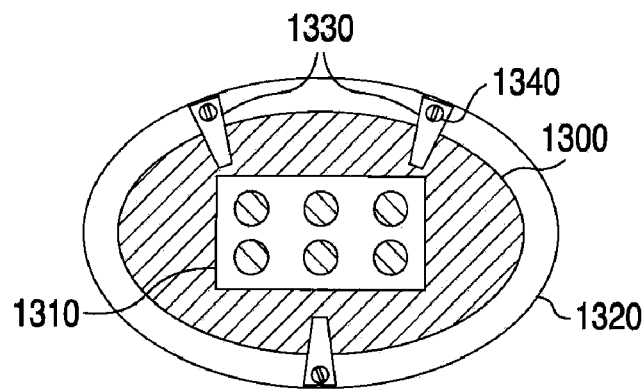
FIG. 5a is a schematic front view of an LED retrofit light engine held by clips onto a cobrahead front window rim via an adaptor.
Figure 5B:
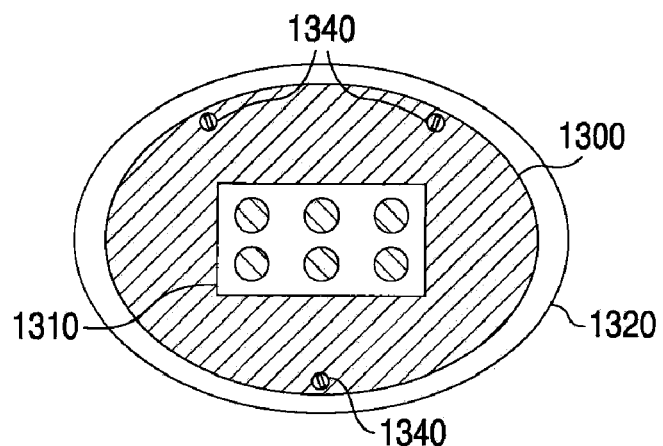
FIG. 5b is a schematic front view of an LED retrofit light engine held by screws onto a cobrahead front window rim via an adaptor.

When the LED retrofit light engine unit is too heavy for the strength of the existing lamp socket mechanical structure, an adaptor or similar equipment could be used to help secure the LED retrofit unit onto the luminaire, as illustrated in FIG. 5a. As illustrated, an adaptor 1300 is used to hold the retrofit LED light engine unit 1310 onto the front window rim 1320 of a cobrahead luminaire using the clips 1330 with a clip screen 1340 equipped for the cobra lens. It should, however, be appreciated that some cobrahead housings are equipped with screws 1340 instead of clips 1330 to hold the front lens as shown in FIG. 5b.

The present invention addresses the need for a high power LED lamp module that fits inside a conventional traffic signal lamp reflector, and which facilitates a fast and simple retrofit thereof. The advantages of the present invention are particularly apparent in housings which physically restrict full rotation of an LED light engine. And although several embodiments have been described, it is to be understood that the present invention is not limited to these embodiments, but rather encompasses any and all variations falling within the scope of the appended claims.

What is claimed is:

1. An LED lamp module for use with a threaded electrical socket connector, comprising:

an LED light engine having a plurality of LEDs mounted to a printed circuit board, wherein the LED light engine includes a first electrical connector;

a second electrical connector having a first end electrically engagable with the first electrical connector and a second end having a threaded outer surface compatible with a threaded electrical socket connector; and a sleeve surrounding said first electrical connector and said first end such that the sleeve allows for relative rotation between said first electrical connector and said first end in a loosened state, and restricts relative rotation between said first electrical connector and said first end in a tightened state.

2. The LED lamp module of claim 1, wherein said light engine and said electrical connector connect via an axial contact and a ring contact.

3. The LED lamp module of claim 1, wherein said light engine and said electrical connector connect via two half-ring contacts.

4. The LED lamp module of claim 1, wherein said light engine and said electrical connector connect via two circular contacts.

5. The LED lamp module of claim 1, wherein said light engine and said electrical connector connect via two square contacts.

6. The LED lamp module of claim 1, wherein the frictional force created by said relative rotation is relatively greater in a tightened state than in a loosened state.

7. The LED lamp module of claim 6, wherein said relative rotation in a tightened state is restricted such that said frictional force does not exceed a breaking point force for any of said sleeve, first electrical connector, or first end.

8. The LED lamp module of claim 1, wherein said sleeve further comprises a flange end and a threaded end.

9. The LED lamp module of claim 8, wherein said electrical connector further comprises an indented hollow cavity at the opposite end of said first threaded end.

10. The LED lamp module of claim 8, wherein said light engine further comprises a flange end, and wherein said electrical connector further comprises a second threaded end.

11. The LED lamp module of claim 10, wherein said sleeve connects said electrical connector to said light engine by simultaneously grabbing said flange end of said light engine and said second threaded end of said electrical connector.

12. The LED lamp module of claim 8, wherein said light engine further comprises a threaded end, and wherein said electrical connector further comprises a flange end.

13. The LED lamp module of claim 12, wherein said sleeve connects said electrical connector to said light engine by simultaneously grabbing said flange end of said electrical connector and said threaded end of said light engine.

14. A method for installing a retrofit LED lamp module in a housing which physically restricts full rotation of an LED light engine, comprising:

connecting a first electrical connector to a second electrical connector, wherein said first electrical connector is attached to said LED light engine, and wherein said second electrical connector further comprises a first end electrically engagable with the first electrical connector and a second end having a threaded outer surface compatible with a threaded electrical socket connector; and tightening said connection via a sleeve surrounding the first electrical connector and the first end such that the sleeve allows for relative rotation between the first electrical connector and the first end in a loosened state, and restricts relative rotation between the first electrical connector and the first end in a tightened state.

15. The method of claim 14, wherein said light engine and said electrical connector connect via an axial contact and a ring contact.

16. The method of claim 14, wherein said light engine and said electrical connector connect via two half-ring contacts.

17. The method of claim 14, wherein said light engine and said electrical connector connect via two circular contacts.

18. The method of claim 14, wherein said light engine and said electrical connector connect via two square contacts.

19. The method of claim 14, wherein the frictional force created by said relative rotation is relatively greater in a tightened state than in a loosened state.

20. The method of claim 19, wherein said relative rotation in a tightened state is restricted such that said frictional force does not exceed a breaking point force for any of said sleeve, first electrical connector, or first end.

21. The method of claim 14, wherein said sleeve further comprises a flange end and a threaded end.

22. The method of claim 21, wherein said electrical connector further comprises an indented hollow cavity at the opposite end of said first threaded end.

23. The method of claim 21, wherein said light engine further comprises a flange end, and wherein said electrical connector further comprises a second threaded end.

24. The method of claim 23, wherein said sleeve connects said electrical connector to said light engine by simultaneously grabbing said flange end of said light engine and said second threaded end of said electrical connector.

25. The method of claim 21, wherein said light engine further comprises a threaded end, and wherein said electrical connector further comprises a flange end.

26. The method of claim 25, wherein said sleeve connects said electrical connector to said light engine by simultaneously grabbing said flange end of said electrical connector and said threaded end of said light engine.

* * * * *